(12) United States Patent
De Haas et al.

(10) Patent No.: US 10,264,917 B2
(45) Date of Patent: Apr. 23, 2019

(54) AIR-BASED FRYER

(71) Applicant: KONINKLIJKE PHILIPS N.V., Eindhoven (NL)

(72) Inventors: Rogier Enrico De Haas, Eindhoven (NL); Reindert Jannes Van Wifferen, Eindhoven (NL); Marc Alexander Pastoors, Eindhoven (NL); Adarsh Shrivastava, Eindhoven (NL); Christian Zainitzer, Eindhoven (NL); Rudolf Wurmitzer, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 105 days.

(21) Appl. No.: 14/895,048

(22) PCT Filed: May 21, 2014

(86) PCT No.: PCT/EP2014/060375
§ 371 (c)(1),
(2) Date: Dec. 1, 2015

(87) PCT Pub. No.: WO2014/195129
PCT Pub. Date: Dec. 11, 2014

(65) Prior Publication Data
US 2016/0100713 A1    Apr. 14, 2016

(30) Foreign Application Priority Data

Jun. 4, 2013  (EP) ..................................... 13170419

(51) Int. Cl.
*A21B 1/24* (2006.01)
*A21B 1/26* (2006.01)
(Continued)

(52) U.S. Cl.
CPC .................. *A47J 37/06* (2013.01); *A23L 5/17* (2016.08); *A47J 37/0641* (2013.01); *A47J 37/1204* (2013.01); *A23V 2002/00* (2013.01)

(58) Field of Classification Search
CPC .......................... A47J 37/0629–37/0641; A47J 37/0745–37/0754; A21B 1/24–1/28; F24C 15/32–15/327
(Continued)

(56) References Cited

U.S. PATENT DOCUMENTS 3,261,343 A * 7/1966 Tibell ....................... A21B 1/26
                                                          126/21 A
3,384,068 A * 5/1968 Perry .................... F24C 15/322
                                                          126/21 A
(Continued)

FOREIGN PATENT DOCUMENTS

| CN | 202775936 U | 3/2013 |
| DE | 20214744 U1 | 2/2004 |

(Continued)

*Primary Examiner* — Michael A Laflame, Jr.

(57) ABSTRACT

The present invention relates to food preparation. In order to provide an apparatus for preparing food of increased variance with improved cooking time and also improved food quality, a desk-appliance apparatus (10) for preparing food is provided, comprising a food preparation chamber (12), an air movement device (14), a heating device (16), and air guiding means (18). The food preparation chamber is provided by a container structure (22) at least partly enclosing a receiving volume (24) for receiving food to be prepared by a through-streaming of hot air; wherein the container structure comprises sidewalls (26) and a bottom wall (28), wherein the bottom wall and/or one of the side walls is air-permeable providing an air entry opening (30) for entering of hot air into the receiving volume, and wherein the container structure comprises an air discharge opening (32). The heating device is configured to heat air of an air flow (Continued)

provided by the air movement device. The air guiding means provide an air duct arrangement (34) from the discharge opening via the heating device and the air movement device to the air entry opening. The heating device is arranged out-of-sight of the receiving volume.

14 Claims, 6 Drawing Sheets

(51) Int. Cl.
    *A47J 37/06* (2006.01)
    *A47J 37/12* (2006.01)
    *A23L 5/10* (2016.01)
(58) Field of Classification Search
    USPC .......... 219/400–407; 99/473–476; 126/21 A, 126/21 R
    See application file for complete search history.

(56) References Cited

U.S. PATENT DOCUMENTS

| | | | | |
|---|---|---|---|---|
| 3,678,245 A | * | 7/1972 | Ackermann | F24C 14/02 126/21 A |
| 4,307,285 A | * | 12/1981 | DeRemer | A47J 37/0635 126/39 M |
| 4,373,430 A | * | 2/1983 | Allen | A21C 13/00 126/20 |
| 4,381,442 A | * | 4/1983 | Guibert | A47J 39/003 126/21 A |
| 4,627,409 A | * | 12/1986 | Kagomoto | F24C 15/322 126/19 R |
| 4,782,214 A | * | 11/1988 | Voegtlin | A21B 1/24 126/21 A |
| 4,817,582 A | * | 4/1989 | Oslin | A21B 1/24 126/20 |
| 4,975,047 A | * | 12/1990 | Mitsuhashi | F27B 17/0083 432/23 |
| 5,394,791 A | * | 3/1995 | Vallee | A21B 1/44 126/21 A |
| 5,500,237 A | * | 3/1996 | Gell, Jr. | A23F 5/046 34/360 |
| 5,556,566 A | * | 9/1996 | Cappello | F24C 15/322 126/21 A |
| 5,671,660 A | * | 9/1997 | Moshonas | A21B 1/245 126/21 A |
| 5,747,775 A | * | 5/1998 | Tsukamoto | A21B 1/245 200/333 |
| 5,756,974 A | * | 5/1998 | Hong | F24C 15/325 126/21 A |
| 5,981,929 A | * | 11/1999 | Maeda | H05B 6/6429 126/299 D |
| 6,054,686 A | | 4/2000 | Pauly | |
| 6,121,582 A | * | 9/2000 | Dollinger | A21B 1/26 219/400 |
| 6,142,064 A | * | 11/2000 | Backus | A47J 37/041 126/190 |
| 6,595,117 B1 | * | 7/2003 | Jones | A21B 1/245 99/386 |
| 6,854,456 B1 | * | 2/2005 | Friedrich | A21B 1/26 126/20 |
| 7,642,728 B2 | * | 1/2010 | Moisin | H05B 41/28 315/224 |
| 8,690,529 B2 | | 4/2014 | Tanaka | |
| 9,301,644 B2 | | 4/2016 | Payen | |
| 2003/0172919 A1 | * | 9/2003 | Rabas | F24C 15/322 126/21 A |
| 2004/0035845 A1 | | 2/2004 | Moon | |
| 2004/0200823 A1 | * | 10/2004 | Paller | A21B 1/26 219/400 |
| 2005/0005781 A1 | * | 1/2005 | Ohtsuka | F24C 15/325 99/476 |
| 2005/0109760 A1 | * | 5/2005 | Tatsumu | F24C 15/325 219/399 |
| 2005/0173399 A1 | * | 8/2005 | Yoshidome | F24C 15/02 219/403 |
| 2006/0131298 A1 | * | 6/2006 | Seuk Oh | F24C 15/325 219/400 |
| 2007/0138160 A1 | * | 6/2007 | Ando | A21B 3/04 219/401 |
| 2009/0134140 A1 | | 5/2009 | Van Der Weij | |
| 2009/0324781 A1 | | 12/2009 | Soudry | |
| 2010/0251903 A1 | * | 10/2010 | Maguire | A47J 27/04 99/421 R |
| 2010/0282097 A1 | | 11/2010 | Schulte | |
| 2011/0049124 A1 | * | 3/2011 | Crayfourd | F24C 15/006 219/400 |
| 2011/0147376 A1 | * | 6/2011 | Ueda | F24C 15/327 219/682 |
| 2013/0180413 A1 | * | 7/2013 | Tjerkgaast | A47J 37/0641 99/447 |
| 2013/0284161 A1 | * | 10/2013 | Johnson | F24C 15/325 126/21 A |

FOREIGN PATENT DOCUMENTS

| | | |
|---|---|---|
| EP | 1867264 A1 | 12/2007 |
| JP | 2006003030 A | 1/2006 |
| WO | 2005048796 A1 | 6/2005 |
| WO | 2006000700 A2 | 1/2006 |
| WO | 2010034338 A1 | 4/2010 |
| WO | 2010125287 A1 | 11/2010 |
| WO | 2012032449 A1 | 3/2012 |

* cited by examiner

AIR-BASED FRYER

This application is the U.S. National Phase application under 35 U.S.C. § 371 of International Application No. PCT/EP2014/060375, filed on May 21, 2014, which claims the benefit of European Application No. 13170419.9 filed on Jun. 4, 2013. These applications are hereby incorporated by reference herein.

FIELD OF THE INVENTION

The present invention relates to food preparation and relates in particular to an apparatus for preparing food and a method for preparing food.

BACKGROUND OF THE INVENTION

An example for an apparatus for preparing food is the Philips air-based fryer, which is an appliance that can cook food, for example fries or chicken, with hot air. In order to heat the food for the preparation of the food, a flow of hot air is moved over the food to heat the same, respectively blown through the food containing volume for heating purposes. Such an appliance can be used, for example, in the household environment. For providing the thermal energy to generate hot air, a heater is arranged in the flow path. For example, WO 2012/032449 A1 describes an apparatus for preparing food with hot air, in particular standard food such as French fries. However, it has been shown that even an increasing range of food could be prepared in a food preparation appliance using hot air, but the operation is suitable primarily for the standard French fries.

SUMMARY OF THE INVENTION

There may be a need to provide an apparatus for facilitated preparing food of increased variance with improved cooking time and also improved food quality.

The object of the present invention is solved by the subject-matter of the independent claims, wherein further embodiments are incorporated in the dependent claims. It should be noted that the following described aspects of the invention apply also for the apparatus for preparing food as well as for the method for preparing food.

According to the present invention, a desk-appliance apparatus for preparing food is provided, comprising a food preparation chamber, an air movement device, a heating device, and air guiding means. The food preparation chamber is provided by a container structure at least partly enclosing a receiving volume for receiving food to be prepared by a through-streaming of hot air, wherein the container structure comprises side walls and a bottom wall. The bottom wall and/or one of the side walls is air-permeable providing an air entry opening for entering of hot air into the receiving volume. The container structure further comprises an air discharge opening. The heating device is configured to heat air of an air flow provided by the air movement device. The air guiding means provide an air duct arrangement from the discharge opening via the heating device and the air movement device to the air entry opening. The heating device is arranged out-of-sight of the receiving volume.

By arranging the heating device out-of-sight of the receiving volume, a direct path for heat radiation is prevented. Thus, convection is the primarily source for the transfer of heat to the food to be prepared. In other words, in combination with a higher airflow, a heater with increased power, i.e. a heater with a higher heat transfer capability to the air flow, can be provided for an improved heat transfer. Since the heater power is determined by the airflow (l/s), a higher air flow means that a higher power heater can be used without creating too much thermal differences between the lower and upper part of the food volume. Since the radiation from the top is prevented, i.e. blocked away, there is no need to achieve the delicate balance between radiation and convection any more. Thus, even in case of a user overfilling the appliance with food, resulting in a lower air flow, although the food quality will be lower than if it would be prepared with normal filling levels, a better food quality is provided compared to the case when the food is exposed to heater radiation. Even in case of a lower flow rate that results in a higher heater temperature, since the heater is cooled less with a lower flow rate, a proper heat distribution is ensured by providing the convection as the only heat source for the food. For example, the temperature of the air that is carrying the convection heat may be measured by a temperature measuring device. In case of a decreasing flow-rate, and therefore an increasing heater temperature, the temperature measuring device may switch off the heater if the air temperature reaches a too high, i.e. critical, level. In a situation where the heater is in direct line of sight of the heater, a higher heater temperature would only partially result in a higher air temperature since only a part of the heat energy would be transported by convection. Especially in the situation were the food is still relatively cold (at the beginning of the process), the overexposure to radiation would not be detected, because the food cools down the air stream. By arranging the heating device out-of-sight of the receiving volume, this is prevented. This also considers the desire to prepare an increasingly variable range of food, since different types of food would have different possible flow-through rates. Since the radiation is omitted as a heat source, there is also no more need for a proper balance of radiation and convection. Thus, also the change of radiation emissivity of the heater during its lifetime is taken into consideration. In case of a decreasing power of the heater, simply an increasing time for preparing the food would be needed. However, since there is no need to watch and regulate the proper balance between radiation and convection, the food quality is optimized.

The term "desk-appliance" refers to an apparatus that is suitable for household purposes, which apparatus can be placed on different working surfaces in a kitchen of the table, or can be place in a shelf or on a cupboard. The desk-appliance relates to an appliance that can be manually moved and carried to different places by a single person. For household purposes the volume occupied by the appliance is constrained to sizes as small as possible. In an example, the desk-appliance relates to a portable appliance.

The term "air guiding means providing an air duct arrangement" relates to an air duct for allowing a circulating airflow. This can be provided by specific air channels or air conduits. However, this can, alternatively or in addition, also be provided by a housing of the apparatus enclosing the different devices and/or elements. For example, the air guiding means comprise air duct segments in the vicinity of the air movement device, guiding the air from the air movement device to the food preparation chamber and from there back to the air movement device. In another example, a rather strong fan as an air movement device is provided inside the housing providing a circulating air flow, wherein the housing provides the air duct. For example, the air movement device and the food preparation chamber are arranged such that a by-passing airflow of the food preparation chamber are prevented, e.g. the food preparation chamber is arranged close to an inner side-wall of the housing, the air movement device is also arranged close to an inner side-wall of the housing, and the air movement device and the food preparation chamber are arranged close to each other.

The term "through-streaming of hot air" refers to the delivery of heat to the food to be prepared by the hot air. The air is not only reaching the upper surface of a food pile, but reaches also interior spaces of the food piles, for example in a pile of French fries, which are also referred to as chips in English, frites in French and Pommes Frites in German. The term "through-streaming of hot air" relates to hot air penetrating food, i.e. food piles, also referred to as food accumulation or food cluster. Thus, the hot air is not only moved around the outer boundary of the food, but directly actually heats up, i.e. transmits the heat directly to places inside the outer boundary areas, such as inside a staple of food parts. Of course, besides French fries, also other food with a similar structure is provided, i.e. food in form of multiple single parts or portion provided in a piled, stapled or heaped manner.

Hence, the "through-streaming of hot air" provides not only heat distribution throughout the food chamber, but also heat transfer to inner portions of the food.

In an example, the air flow is provided with a high velocity and in particular with a high flow rate in the food preparation chamber. For example, an airflow rate of approximately minimum 20 l/sec is provided.

In an example, an airflow path is provided with minimal number of changes in the cross-section. For example, an airflow path is provided that changes its cross-section only in a range of approximately maximum 40% from the point where the air is exiting a ventilation device to the point where the air is entering the ventilation device again. In another example, changes of the cross-section are provided in a range of approximately 20% maximum. Nozzles should be avoided.

In an example, a nozzle-free airflow path is arranged.

In an example, the apparatus for preparing food delivers heat to the food to be prepared primarily by the hot air. In an example a one-way heating is provided by the hot air, i.e. the hot air is the only heat source affecting, or impacting on the food in the food preparation chamber.

The food preparation chamber provided by the container structure may comprise an insert like a basket structure, for example with a mesh structure to insert food in a facilitated way, and also to take the prepared food out of the apparatus again after preparation. The container structure may also be removable for filling and emptying purposes as well as for cleaning purposes.

The heater only, or at least to a large extent, provides thermal energy in form of convection, i.e. in form of the hot air flow, and not by radiation. Thus, even with different food types and amounts, the heat source i form of the hot air results in good and homogenous food quality and also in short or at least minimized cooking times. Thus, an increasing range of food can be prepared.

The term "out-of-sight" also comprises arrangements where the heater is placed out of sight to an extent of for example 70% or more. In an example, 90% are out-of sight.

For example, the heating device comprises one or more heating elements with a heat-providing surface. Some portions of the heat-providing surface are facing towards, i.e. in direction of the food preparation chamber. The following is meant by "out-of-sight": Seen from the food preparation chamber, a major part of the heat-providing surfaces facing the food preparation chamber is not visible, i.e. shielded. For example, if the heater would be replaced by light sources, only a little amount of the light providing surface would be seen from the food preparation chamber, or no light at all.

For example, the heat provided by the heating device is shielded or blocked from radiation towards the food. This provides an arrangement where heat, i.e. thermal energy is transferred to the food only (or at least to the largest extent) by the hot air. Of course, hot air may also heat up an enclosure or side-walls, and these surfaces will then transfer heat via radiation to the food. But this heat transmission is neglectable in relation to the heat transfer by the hot air. For example, the heat transfer via hot air, i.e. via convection is provided to be at least 70% of the thermal energy transfer to the food. In an example, at least 80, e.g. minimum 90 or 95% of the heat is provided by the hot air.

The term "out-of-sight" relates to the direct path of heat radiation. For example, the heat radiation path is independent from an optical path, i.e. non-related to a line of direct (visible) light. For example, radiated heat may pass through a filter or air distributing element, while it is not possible to look through the filter, i.e. the filter is non-transparent. According to the example of the invention, the heater is arranged such that the heat that is radiated by the heating elements, for example hot surfaces, which are provided for convection of heat by the air streaming passed the hot surfaces (the air streaming forced by the air movement means, such as a ventilation device or fan), also provide radiation. However, measures are provided that the radiated heat is not affecting the food in the food container. In an example, the measures may comprise the arrangement of the heating elements on the side of food container, i.e. next to the outer side of the side wall of the container. The measures may comprise shielding elements to prevent the heat transfer of the radiation. For example, a container side wall may be arranged between the heating element and the part of the container volume arranged for receiving the food. In another example, separate protective elements are providing shielding for the heat radiation from the heating elements. In another example, the heating elements are arranged such that they radiate heat only in a direction away from the food.

According to an example, the heating device is arranged sidewards of the food preparation chamber.

According to an example, the air movement device is a fan with an air inlet and an air outlet. The fan is provided sidewards of the food preparation chamber.

By providing the fan sidewards of the food preparation chamber, the air flow path is improved by arranging the fan closer to the air entry opening, where the most powerful air stream is needed for a proper and distributed entering of hot air into the food to be prepared.

According to an example, as an air movement device, a fan is provided that has an air suction side and an air blowout side. In use, the air is blown out at the air blowout side with a mean blowing direction, and the mean blowing direction is provided with a tilted angle to both the horizontal and the vertical.

This provides the advantage that the demand for guiding the air flow from the fan is reduced, since the air flow is already provided with a tilted angle, and not in a perpendicular manner, hitting, for example, lower surfaces. This is also advantageous in that the air flow at the air blowout side may show the maximum air speed with regards the to the circulating air flow path.

The mean blowing direction can be seen as the primary or main blowing direction of the ventilated, i.e. moved air. However, since the actual blowing characteristic of an air stream is not directly visible, the following is noted: In a quite general example, the fan comprises at least one rotating part to move the air, such as a rotating blade, so that an axis of rotation is provided. The rotation of air movement elements, such as blades or the like, results in a respective blowing direction. For example, the air movement device can be provided as an axial fan where a mean blowing direction is aligned with the axis of rotation, for example parallel to the rotation axis. As another example, the air movement device can be provided as a centrifugal fan, also referred to as a radial fan where a mean blowing direction is aligned with a tangential line with regard to the rotating blade(s), wherein the tangential line is perpendicular to the rotating axis. Thus, the direction of the rotating axis also determines the basic direction for the air stream, e.g. parallel in case of an axial fan, or perpendicular in case of a centrifugal fan.

In an example, the axis of rotation is provided in a tilted angle with respect to the horizontal and/or the vertical.

According to an example, the fan is a centrifugal fan inside a fan housing with an axial air inlet and a radial air outlet. The centrifugal fan comprises a fan rotating in a rotating plane, and the rotating plane is provided with a tilted angle to both the horizontal and the vertical.

This provides the advantage that the air exiting the fan needs less deviation or air guidance than the air guidance taking place inside the fan. In other words, the approximately perpendicular change of direction of the air flow inside the fan is integrated into the air flow path such that an air stream towards the fan from the food preparation chamber is provided with an angle larger than 90°, as well as the air exiting the fan shows a change of direction also with an angle larger than 90° before being applied to the food preparation chamber. The sharpest bent of the air flow path takes place in the fan itself. Since a sharp bent means an increased flow resistance for the air stream, the provision of angles larger than 90° in flow stream areas with higher flow speed means an advantage in terms of minimizing flow resistance for maximizing the flow. The provision of a rather sharp bent, or even the sharpest bent, inside the fan takes into consideration that the flow is influenced by the fan blades anyhow here.

According to an example, the tilted angle comprises an angle to the horizontal in a range of approximately 10° to 80°. For example, an angle of approximately 45° is provided.

It must be noted that a skilled person also understands that a solution may be provided that defers from these directions and which solution provides structural air guiding means.

The tilted arrangement also provides the advantage of a compact housing.

According to a further example, a first line is defined by the rotating axis, a second line is arranged perpendicular to the first line in the rotating plane, and a third line is perpendicular to the bottom wall, running through a centre of the bottom wall. The first line, the second line, and the third line are arranged in one plane and form a triangle. An inner circle of the triangle is arranged inside a housing structure of the apparatus. The first and the second line have an intersection point that is arranged in a middle region of the height of the housing structure. The inner circle has a maximum diameter.

According to a further example, an air duct arrangement comprises a number of guiding portions, in which an air flow direction is changed. A first guiding portion is provided downstream, following the air movement device, and a second guiding portion is provided upstream in front of the air movement device. The first guiding portion provides a lower degree of change of direction of the air flow than the second guiding portion.

According to a further example, a collecting device with a collecting volume is provided below the food preparation chamber for collecting residual material.

Thus, it is provided to collect, for example, oils and particles on a specific location in the removable pan of the appliance. Oils and particles that come from the food will be blown to this location by the hot air that exits the fan system. After the cooking process, the consumer can easily access this location for cleaning. This may lead to more frequent cleaning and prevents oils to be burned into the surfaces by repeated heating. Further, it is also preventing obstruction of the most important air flow path in the appliance. This supports the appliance performance to be consistent during the use. Another aspect is that the oil and particle volume may be located at a position where the air temperature is low enough to prevent smoking during the cooking process.

It is explicitly noted that, according to another aspect, the collecting device is provided in relation with features mentioned above, but without, for example, the tilted arrangement of the air movement device or the out-of-sight arrangement of the heating device. For example, an apparatus for preparing food is provided, comprising a food preparation chamber, an air movement device, a heating device, and air guiding means. The food preparation chamber is provided by a container structure at least partly enclosing a receiving volume for receiving food to be prepared by a through-streaming of hot air. The container structure comprises side walls and a bottom wall. The bottom wall and/or one of the side walls is air-permeable, providing an air entry opening for entering of hot air into the receiving volume. The container structure further comprises an air discharge opening. The heating device is configured to heat air of an air flow provided by the air movement device. The air guiding means provide an air duct arrangement from the discharge opening via the heating device and the air movement device to the air entry opening. According to the other aspect, a collecting device with a collection volume is provided below the food preparation structure for collecting residual material, e.g. oil and particles.

According to a further example, an air guiding element is provided that directs a horizontal air flow below the container structure in an upwards direction towards the air entry opening. The collecting device is arranged besides the air guiding element on a side facing away from the horizontal air flow.

According to a further example, an air distributing duct is provided below the air entry opening of the bottom wall. An air guide is provided as an elevation arranged on a lower surface of the air distributing duct below the air entry opening. The air guide is arranged in a skewed manner in relation to a perpendicular direction of an out-blowing direction of the air outlet such that below the air entry opening an evenly distributed air flow is provided.

For example, the elevation is extending across the cross-section of the air distributing duct. In an example, the elevation is extending across at least a third of the cross-section, for example in one section or also in separated sections. In a further example, the elevation is extending across at least half of the cross-section. In a still further example, the elevation is extending across the complete cross-section.

The skewed or rotated air guide converts the uneven air flow from the fan system in an air flow that is evenly distributed over the bottom surface, for example of a food basket for receiving fries, for example. It must be noted that in the cross-sectional view, the rotation is not visible.

It is explicitly noted that, according to a further aspect, the air distributing duct is provided in relation with features mentioned above, but without, for example, the tilted arranged of the air movement device or the out-of-sight arrangement of the heating device. For example, an apparatus for preparing food is provided, comprising a food preparation chamber, an air movement device, a heating device, and air guiding means. The food preparation chamber is provided by a container structure at least partly enclosing a receiving volume for receiving food to be prepared by a through-streaming of hot air. The container structure comprises side walls and a bottom wall. The bottom wall and/or one of the side walls is air-permeable providing an air entry opening for entering of hot air into the receiving volume. The container structure further comprises an air discharge opening. The heating device is configured to heat air of an air flow provided by the air movement device. The air guiding means provide an air duct arrangement from the discharge opening via the heating device and the air movement device to the air entry opening. According to a further aspect, an air distributing duct is provided below the air entry opening of the bottom wall, wherein an air guide is provided as an elevation arranged on a lower surface first the air distributing duct below the air entry opening. The air guide is arranged in a skewed manner in relation to a perpendicular direction of an out-blowing direction of the air outlet such that below the air entry opening, an evenly distributed air flow is provided.

For example, the elevation is extending across the cross-section of the air distributing duct. In an example, the elevation is extending across at least a third of the cross-section, for example in one section or also in separated sections. In a further example, the elevation is extending across at least half of the cross-section. In a still further example, the elevation is extending across the complete cross-section.

According to a further example, a flow spreader is provided between the air outlet and an air distribution zone provided below the air entry opening of the bottom wall. The flow spreader is provided as a duct segment with a decreasing cross-section across an air passage direction to compensate for an asymmetrical air output of the air outlet.

It is explicitly noted that, according to a still further aspect, the flow spreader is provided in relation with features mentioned above, but without, for example, the tilted arrangement of the air movement device or the out-of-sight arrangement of the heating device. For example, an apparatus for preparing food is provided, comprising a food preparation chamber, an air movement device, a heating device, and air guiding means. The food preparation chamber is provided by a container structure at least partly enclosing a receiving volume for receiving food to be prepared by a trough-streaming of hot air. The container structure comprises side walls and a bottom wall. The bottom wall and/or one of the side walls is air-permeable providing an air entry opening for entering of hot air into the receiving volume. The container structure comprises an air discharge opening. The heating device is configured to heat air of an air flow provided by the air movement device. The air guiding means provide an air duct arrangement from the discharge opening via the heating device and the air movement device to the air entry opening. According to the still further aspect, a flow spreader is provided between the air outlet and an air distributing zone provided below the air entry opening of the bottom wall. The flow spreader is provided as a duct segment with a decreasing cross-section across an air passage direction to compensate for an asymmetrical air output of the air outlet.

In a further example, the air duct wall for angled position is the outer, or lowest-positioned, air duct wall since this also supports to bend the air stream in a useful direction. The air duct becomes part of the air bent system and complies with the strategy to keep the total sum of bents below 360°.

The terms "bent" and "angle of the bent" in relation with the streaming direction of hot air relates to the deviation or angular change of the direction of the airflow in relation to the straight-forward direction. For example, if there is no bent, i.e. the air stream direction is not changed, the angle would be referred to as an angle of 0°, a bent with an angle of 5° would relate to a slight change of the air stream direction to the side. If the air stream is guided such that the air stream direction changes in a rectangular manner, this would be referred to as an angle of bent of 90°; a U-turn like deviation, or in other words air guidance in a reverse manner would be a bent with an angle of 180°.

According to the present invention, also a method for preparing food in a desk-appliance apparatus is provided, comprising the following steps: In a first provision step, food is provided in a food preparation chamber provided by a container structure at least partly enclosing a receiving volume for receiving the food to be prepared. In a second provision step, a through-streaming of hot air is provided in the food preparation chamber. The through-streaming of hot air is provided by an air movement device and a heating device. A circulating air flow is provided by air guiding means providing an air duct arrangement from a discharge opening of the container structure via the heating device and the air movement device to an air entry opening of the container structure. The air is heated by the heating device that is arranged out-of-sight of the receiving volume.

According to an aspect of the invention, an air-based fryer is provided where the heater is provided such that direct radiation of heat from the heater to the food inside the chamber is omitted and prevented. Thus, the heater only transfers heat to the air flow passing the heater, resulting in the air flow being the only heat source for heating the food inside the food preparation chamber. Thus, a potential imbalance of radiated heat and convected heat is also omitted, which means that the regulation of the provision the thermal energy and the air ventilation, or air flow, is facilitated.

According to a further aspect of the present invention, the resistance of the flow path is minimized, aiming at a minimal some of all angles of bents in the air recirculating system of maximum 360°. In one example, the outlet of the fan housing is provided such that the air exiting the fan has to make relatively smooth bents, or smooth air deviation, before reaching a further air guide, which directs the air flow in the food chamber. Due to the high air speed at these locations, the losses due to turbulence and friction are minimized, resulting in a relatively low air resistance and therefore a higher total flow rate and also a larger impulse of the air that is entering the food via the air guide. In an example, the fan is arranged such that the air has to change direction before entering the fan, but at this location, it is not critical, because the air speed is at least a little bit lower, and there is also a so-called under pressure or suction. It may be preferred to use suction in this bent, with cross-sectional changes for example, since this may result in less turbulence and losses in comparison with blowing air through such bent.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

DETAILED DESCRIPTION OF EMBODIMENTS

Figure 1:
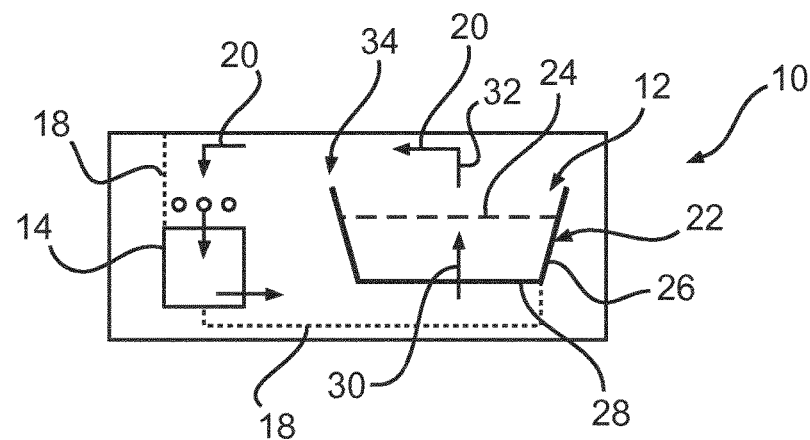
FIG. 1 shows an example of a schematic cross-section of an apparatus for preparing food with a heating device arranged out-of-sight of a receiving volume.

FIG. 1 shows a desk-appliance apparatus 10 for preparing food. The apparatus 10 comprises a food preparation chamber 12, an air movement device 14, a heating device 16, and air guiding means. It is noted that the air guiding means are indicated with dotted lines 18 in FIG. 1, in combination with arrows 20, schematically indicating an air flow. The food preparation chamber 12 is provided by a container structure 22 at least partly enclosing a receiving volume 24 for receiving food to be prepared by a through-streaming of hot air. The receiving volume 24 is indicated with an upper dotted line. Further, the container structure 22 comprises side walls 26 and a bottom wall 28. The bottom wall 28 and/or one of the side walls 26 is air-permeable providing an air entry opening, indicated with arrow 30, for entering of hot air into the receiving volume. It is noted that the air entry opening 30 may be provided across the whole surface of the bottom wall 28, or in selected areas. Further, the container structure comprises an air discharge opening, as indicated with upper arrow 32. The air discharge opening may be provided by an opening across the whole upper surface, as shown in FIG. 1. The heating device 16 is configured to heat air of an air flow provided by the air movement device 14. Further, the air guiding means 18 provide an air duct arrangement 34 from the discharge opening 32 via the heating device 16 and the air movement device 14 to the air entry opening 30.

FIG. 1 shows an example of an apparatus 10, wherein the heating device 16 is arranged out-of-sight of a receiving volume 24. It must be noted that the air movement device 14 is schematically shown. The air movement device 14 can be provided in different variations. Further, it must be noted that the heating device 16 can also be arranged in different variations, as long as a direct line of sight from the heating device 16 to the receiving volume 24 is omitted, i.e. prevented.

For example, the heating device 16 is arranged sidewards of the food preparation chamber 12.

In an example, an air duct is provided between the outlet of the fan, e.g. a centrifugal fan, and the air entry opening of the bottom wall, which shall also be described in the following.

Figure 2:
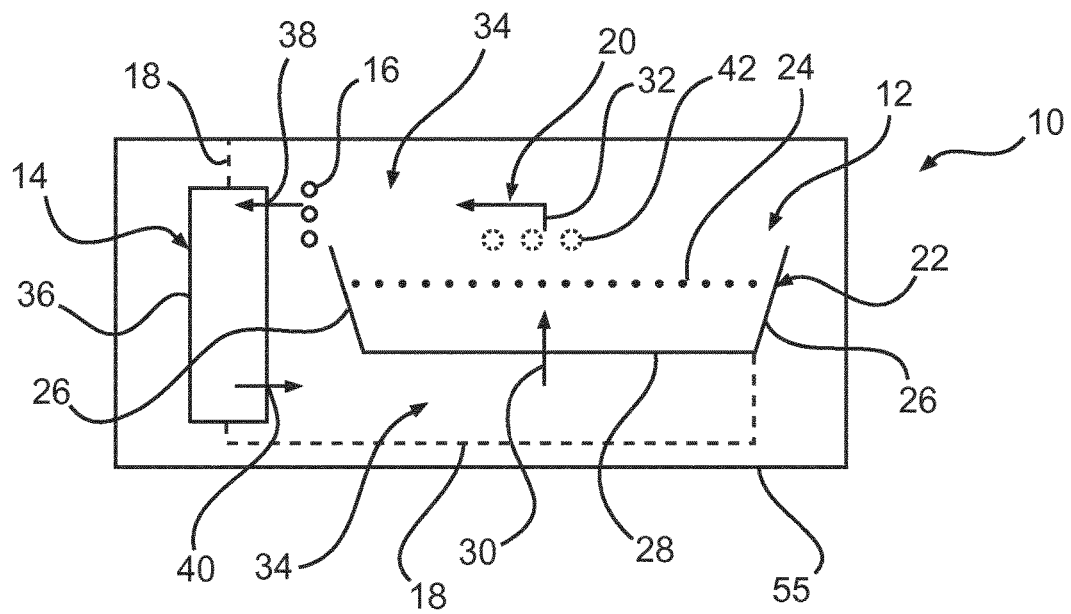
FIG. 2 shows a schematic cross-section of an example of an apparatus for preparing food.

FIG. 2 shows a further example of the apparatus 10 for preparing food. The apparatus 10 comprises the food preparation chamber 12, the air movement device 14, the heating device 16, and the air guiding means. It is noted that the air guiding means are indicated with dotted lines 18 in FIG. 2, in combination with arrows 20, schematically indicating an air flow. The food preparation chamber 12 is provided by the container structure 22 at least partly enclosing the receiving volume 24 for receiving food to be prepared by a through-streaming of hot air. The receiving volume 24 is indicated with an upper dotted line. Further, the container structure 22 comprises the side walls 26 and the bottom wall 28. The bottom wall 28 and/or one of the side walls 26 is air-permeable providing the air entry opening, indicated with arrow 30, for entering of hot air into the receiving volume. It is noted that the air entry opening 30 may be provided across the whole surface of the bottom wall 28, or in selected areas. Further, the container structure comprises the air discharge opening, as indicated with upper arrow 32. The air discharge opening may be provided by the opening across the whole upper surface, as shown in FIG. 2. The heating device 16 is configured to heat air of the air flow provided by the air movement device 14. Further, the air guiding means 18 provide the air duct arrangement 34 from the discharge opening 32 via the heating device 16 and the air movement device 14 to the air entry opening 30.

The air movement device 14 is a fan 36 with an air inlet 38 and an air outlet 40. The fan 36 is provided sidewards of the food preparation chamber 12. It is noted that according to the example shown in FIG. 2, the heating device 16 is provided sidewards of the food preparation chamber 12. However, also other examples can be provided, for example indicated with dotted circles 42, indicating a location of the heating device 16 above the food preparation chamber 12.

According to an example, described in more detail below, the heating device 16 is arranged out-of-sight of the receiving volume 24.

An outer frame structure indicates a possible housing enclosing the apparatus 10 for preparing food. Of course, the housing can be provided with an insert opening for filling food into the food preparation chamber 12, which will also be described in more detail in relation with other figures below.

In FIG. 3, as an air movement device 14, a fan 44 is provided which has an air suction side 46, and an air blowout side 48. It is noted that next to the air suction side 46, an arrow is shown indicating air being sucked in on the air suction side. In use, the air is blown out at the air blowout side with a mean blowing direction 50. The mean blowing direction 50 is provided with a tilted angle 52 to both the horizontal and the vertical. For example, the horizontal is referred to as a horizontal portion 54 of a housing structure 55, and the vertical is referred to as a vertical portion 56 of the housing structure 55.

Figure 3A:
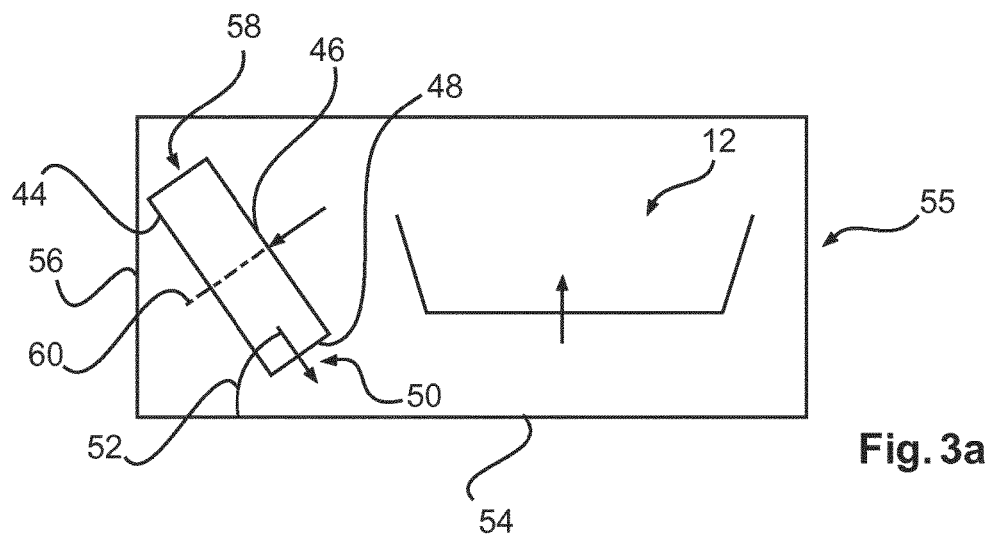
FIG. 3 shows further examples of a schematic cross-section of an apparatus for preparing food in a first example with a centrifugal fan inside a scroll housing in FIG. 3A, in a second example with an axial fan in FIG. 3B, and a third example of a cross-flow blower in FIG. 3C.

FIG. 3A shows an example of the fan 44 as a centrifugal fan 58 with an axial air inlet direction aligned with the arrow 46, and a radial air outlet, aligned with the arrow 48. A line 60 is indicating an axis of rotation.

Figure 3B:
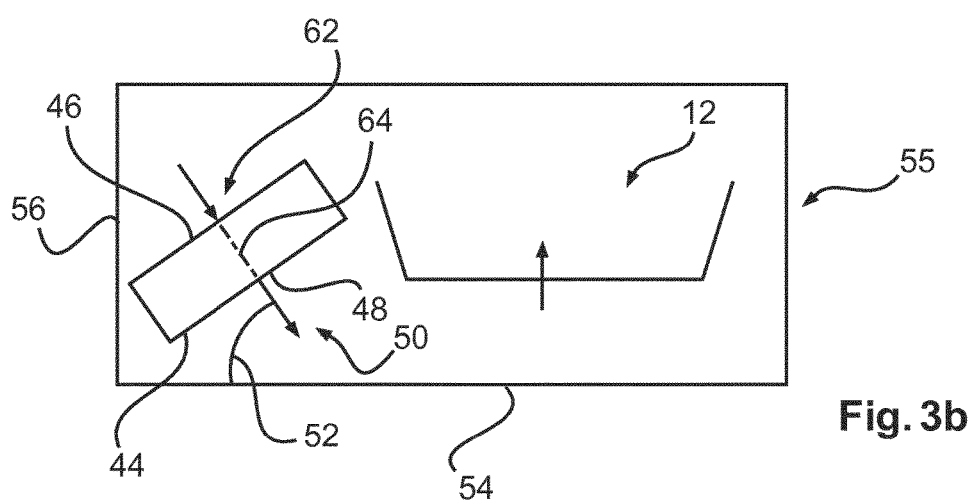

FIG. 3B shows the fan 44 as an axial fan with an axial air inlet, aligned with arrow 46, and an axial air outlet, aligned with the arrow 48. The axial fan 62 comprises a fan rotating around a rotating axis 64. The rotating axis 64 is provided with a titled angle to both the horizontal and the vertical, similar to the tilted angle 52.

In an example, the fan 44 is provided sidewards of the food preparation chamber when the food preparation chamber is in use.

Figure 3C:
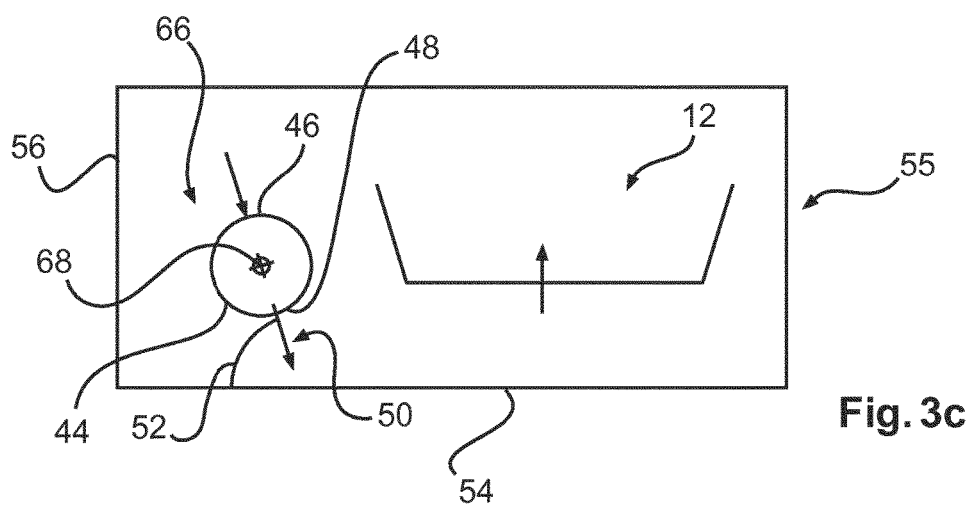

FIG. 3C shows the fan 44 in form of a cross-flow blower or cross-flow fan 66 with a rotating structure rotating around a rotating axis 68, i.e. a cylinder like structure that is perpendicular to the drawing plane.

Figure 4:
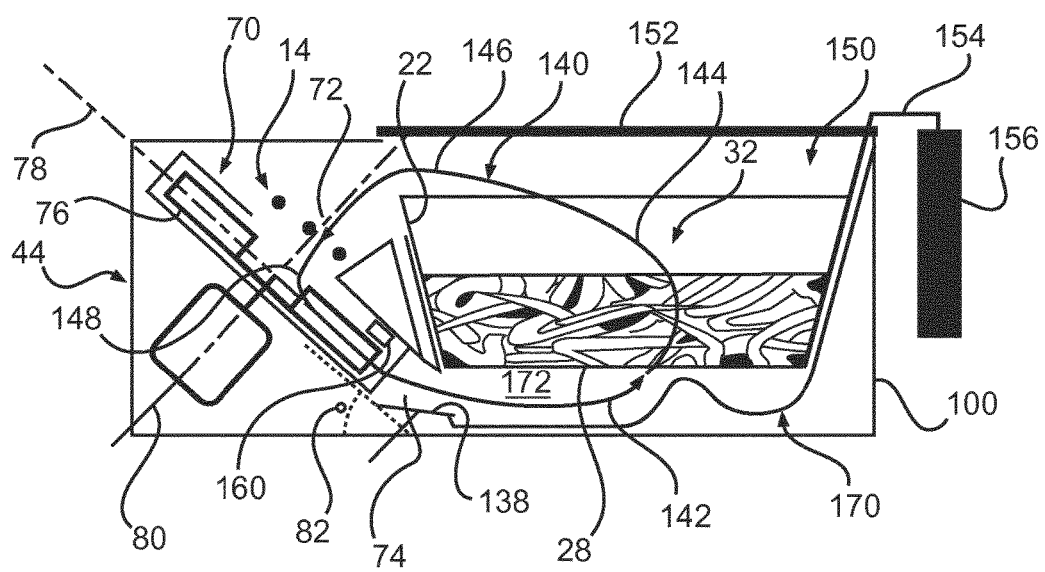
FIG. 4 schematically shows a cross-section through a further example of an apparatus for preparing food.

FIG. 4 shows a further example, wherein the fan 44 is a centrifugal fan 70 inside a fan housing with an axial air inlet 72 and a radial air outlet 74. The centrifugal fan comprises a fan 76 rotating in a rotating plane 78 around a rotating axis 80. The rotating plane 78 is provided with a tilted angle, for example angle 82, to both the horizontal and the vertical.

The centrifugal fan provides an integrated guiding of an air stream coming from a first direction and leaving in a second direction, wherein the second direction differs from the first direction by approximately 30° to 120°, for example approximately 90°.

The tilted angle is provided such that a deflection or guidance of the air flow coming from the air movement device 14 is necessary in an amount of less than 90° in order to reach the area below the food preparation chamber 12. For example, the tilted angle comprises an angle to the horizontal in a range of approximately 10° to 80°. In an example, the angle is provided in a range of approximately 30° to 60°, for example approximately 45°.

Figure 5A:
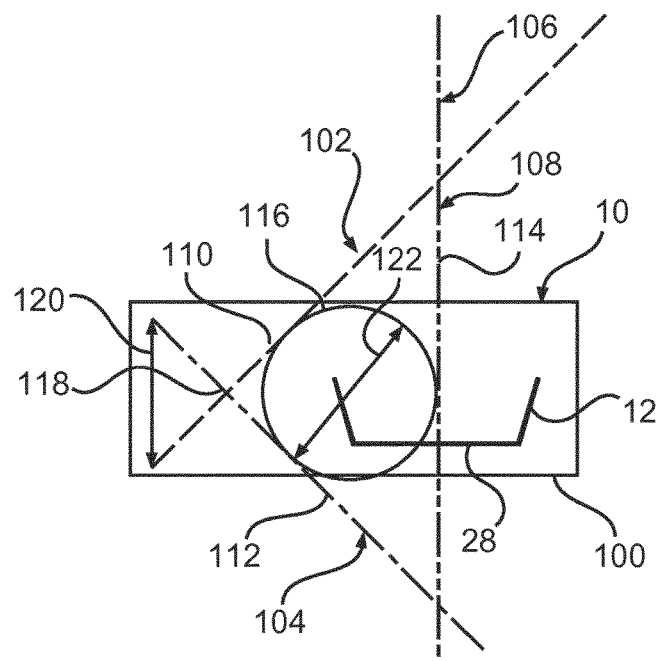
FIG. 5 shows examples of geometric relations in the context of a schematic cross-section of an apparatus for preparing food in FIGS. 5A, 5B, and 5C.

With references to FIGS. 5A, 5B, and 5C, geometrical relations of a further example shall be explained in the following. The apparatus 10 is indicated by a rectangular frame 100, indicating a housing structure. Further, the food preparation chamber 12 is symbolically shown. Still further, a first line 102 is defined by the rotating axis of a centrifugal fan, which is not further shown. A second line 104 is arranged perpendicular to the first line 102 in the rotating plane, as mentioned above. A third line 106 is perpendicular to the bottom wall 28 and running through a centre of the bottom wall 28. The first line 102, the second line 104, and the third line 106 are arranged in one plane and form a triangle 108 provided by a first section 110 of the first line 102, the first section 110 extending from the intersection of the first line 102 with the second line 104 to the intersection of the first line 102 with the third line 106. The triangle 108 is further defined by a second section 112 of the second line 104, the second section 112 reaching from the intersection of the second line 104 with the first line 102 to the intersection of the second line 104 with the intersection of the third line 106. As a third side of the triangle 108, a third section 114 of the third line 106 is defined, the third section 114 extending from an intersection of the third line 106 with the first line 102 to an intersection of the third line 106 with the second line 104. An inner circle 116 of the triangle 108 is arranged inside the housing structure 100 of the apparatus. The first and the second line have an intersection point 118 that is arranged in a middle region of the height of the housing structure. The height is indicated with a double arrow 120. According to the invention, the inner circle 116 has a maximum diameter 122.

The "middle region" relates to a height arranged in the middle third of the height. The arrangement of the intersection in the middle of the height allows a maximum diameter of a fan, e.g. a centrifugal fan.

Figure 5B:
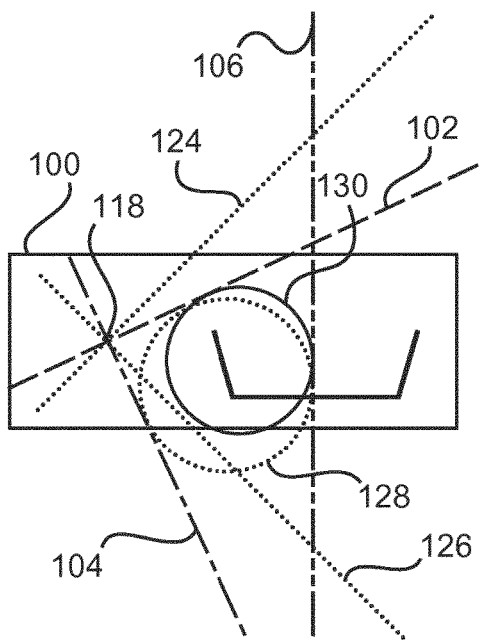

FIG. 5B shows a further possible arrangement of the first line 102, the second line 104, and the third line 106, wherein the first line 102 and the second line 104 are maintained perpendicular to each other, but tilted together in relation to the third line 106, namely approximately 10° to 30° in a clockwise direction. For a better understanding, a first dotted line 124 indicates the position of the first line 102 of FIG. 5A, and a second dotted line 126 indicates the position of the second line 104 of FIG. 5A. The first line 102, the second line 104, and the third line 106 form a triangle, however with different proportion compared to FIG. 5A. An inner circle of the triangle with a maximum diameter is indicated by a dotted circle 128. However, this inner circle 128 would extend outside of the housing structure 100. Thus, an inner circle of the triangle arranged inside the housing structure 100 would have to smaller, as indicated with a full line circle 130.

Figure 5C:
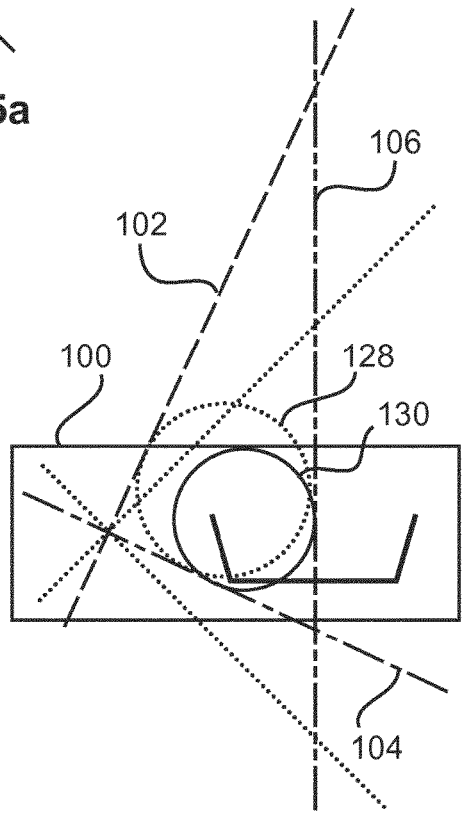

FIG. 5C shows a further example, in which the first line 102 and the second line 104, being perpendicular to each other, are slightly rotated counter-clockwise, leading to a similar situation, in which the circle 130, i.e. the dotted circle, indicates the inner circle of the triangle, but the circle 128 in straight line shows the maximum diameter of a circle arranged inside the housing structure 100 and as an inner circle of the triangle.

Thus, in order to provide the inner circle with a maximum diameter, the degree of angulations of the triangle should be well balanced by providing the first and the second lines 102, 104 with approximately 45° to both the horizontal and the vehicle.

With reference to FIG. 4, some further examples are described. As indicated by two lines 138, an air duct arrangement comprises a number of guiding portions, in which an air flow direction is changed. It is noted that air guiding portions are also provided by housing parts or elements not further shown in detail which is why they are not labelled with a reference number. For a better understanding, a simplified circulating air flow 140 is indicated. For example, hot air exiting from the air movement device 14 is slightly changing its direction due to the guiding portion 138. Further, the air flow is changing its direction below the bottom wall 28, as indicated with bending portion 140. Following, the air flow streams through food to be prepared and upon exiting the food, i.e. at the air discharge opening 32, a further change of direction, as indicated by a further bending portion 144, is provided. Upon reaching a portion above the side walls, a further bending portion 146 indicates a further guiding portion. Still further, a bending portion 148 arranged inside the air movement device 14 indicates that a further change of airflow direction is provided.

According to an example, a first guiding portion, for example the guiding portion 138, is provided downstream, following the air movement device 14, and a second guiding portion, for example the guiding portion 146, is provided upstream in front of the air movement device 14. The first guiding portion 138 provides a lower degree of change of direction of the air flow than the second guiding portion 146.

For example, the guiding portion with the sharpest bent for the air flow is provided at the suction side of the air movement device, e.g. the fan. The least sharp bent is provided near the air movement device outlet.

In an example, from all guiding portions of the air duct arrangement, the second guiding portion provides a maximum degree of change of direction of the air flow, and the first guiding portion provides a minimum degree of change of direction of the air flow.

Preferably, the guiding portions are providing minimum number of bents for a maximum air flow, i.e. providing minimized air flow resistance. In an example, the air duct arrangement is provided with guiding portions that provide a sum of bents of approximately 360°.

In a further example, also shown in relation with FIG. 4, the housing structure 100 comprises an upper opening 150 for inserting the container structure 22 from a top. A cover device 152, for example a lid, is provided for closing the opening 150 during food preparation. For example, the container structure 22 is provided as a removable pot or basket 154 with a handle bar or a grip portion 156 for easier handling.

In a further example, also indicated in relation with FIG. 4, sensor means 160 are provided in relation with the air movement device 14 for detecting air temperature of the air stream supplied by air movement device 14. For example, the sensor means 160 are sensors arranged inside a housing structure of the air movement device 14. The sensor means may also be provided downstream the air movement device between the air outlet and the bottom wall of the container structure. The sensors can detect if the air heated by the heating device gets too hot, due to a malfunction of the heating device, for example.

According to a further example, also shown in relation with FIG. 4, a removable pan structure 170 is provided at least partly below the food preparation chamber. For example, the food preparation chamber 12 is at least partly inserted into the removable pan structure 170. An air-guiding duct 172 is provided between the removable pan structure 170 and the bottom wall 28. The air-guiding duct 172 is provided for guiding heated air stream from the air outlet, for example the radial air outlet 74, to the air entry opening 30.

The air-guiding duct is provided by the removable pan structure and the bottom wall as the physical features; the food preparation chamber relates to the space or area defined by the container walls that are enclosing the food preparation chamber at least partly.

In an example, the removable pan structure is provided as one removable pan. In another example, two or more removable pans are provided.

In a further example, a non-removable pan structure is provided, for example a pan fixed to the housing, and a separately removable small oil and particle collection container is provided.

It must be noted that although FIG. 4 shows the different aspects described above in a single embodiment, it is provided that, for example, the aspect of the guiding portions, the aspect of the sensor means, the aspect of the centrifugal fan, the aspect of the removal pan structure can be provided in combination with the respective other features, or also without the respective other features, i.e. in different varying combinations.

Before referring to the following figures showing further embodiments, some general aspects of the present invention shall be described in the following.

The term "out-of-sight" relates to an arrangement where a direct (linear) line between the heating device and the receiving volume, i.e. in particular the food arranged in the receiving volume, is not possible, because the direct connection line is blocked by other structural parts.

The thermal energy provided by the heating device is predominantly transferred via heat convection. The air flow is transporting and transmitting the thermal energy to the food to be prepared. However, some of the radiation from the heating device may be reflected by the lid, for example. Nevertheless, the resulting energy flow in form of this radiated heat is much lower than the convection part. For example, the heating device is arranged in a concealed manner with respect to the food being prepared. In one example, a side wall shades off radiated heat from the heating device with respect to the receiving volume, i.e. the side wall is a barrier with respect to direct line of connection between the heating device and the receiving volume. This avoids that the food is heated by direct radiation from the heating device, but only by heat provided by the generated heated air. Nevertheless, a reflector on top of the food may be provided for an improved use of the thermal energy provided to the food by the heated air. The receiving volume does not experience any heat transfer by direct radiation from the heating device.

The "air movement device" is also referred to as a fan device or a ventilation device. The air movement device provides movement of heated air in a circulating fashion for heating the food to be prepared. The air movement device provides movement of the air without varying other air parameter, in one example. In another example, the air movement device also provides influencing or adjusting other air properties/parameters, such as humidity, oxygen content, ratio of reused air and fresh air input, for example. The heated air may be provided to food having different insertion temperatures. For example, in case of applying heated air to frozen fries, the resulting air flow may be a temperature below 0° C., at least for the first time span, e.g. for the first 10 to 30 seconds, since the thermal energy provided to the heated air by the heater is nearly completely transferred to the frozen fries. At the end of the food preparing process, the air temperature may reach 140° C. to 200° C. or more. The air temperature may be adjustable, depending on the type of food.

The container structure may enclose the food preparation chamber partly in form of a pot or pan by providing a bottom wall and a surrounding continuous side wall, or a number of side walls.

The container structure may enclose the food preparation chamber completely in form of a closed pot or pan by providing not only a bottom wall and a side wall, but also a closing upper structure such as a lid or cover.

In any case, provisions are taken to let a stream of heated air entering the food preparation chamber, i.e. via the air entry opening, and also to let the air exiting the food preparation chamber, i.e. via the air discharge opening.

The term "opening" in relation with the air stream relate to the capability of air passing through. This may be provided, for example, by a sieve, grid, or mesh-like structure. The term "heated air" relates to air heated up to temperature range of approximately 80 to 200° C. at the end, or the temperature peak, of the food preparation process. The air may be provided with different amounts of relative humidity. For example, a relative humidity range of 5 to 100% may be provided.

The term "sidewards of the food preparation chamber" refers to an arrangement of the air movement device on the side or besides the food preparation chamber in a horizontal direction. For example, the air movement device is located next to side walls of the food preparation chamber. The air movement device may also be located sidewards in a horizontal direction and displaced upwards, such that the air movement device extends above the container structure.

The term "the horizontal" relates to a horizontal plane or axis, when in normal operation. The term "the vertical" relates to a respective vertical plane or axis.

For example, the term horizontal relates to a desk surface or working surface, for example in a kitchen. In another example, the term vertical relates to a perpendicular line with regard to the horizontal.

For example, the air discharge opening 32 is provided by side wall portions of the container structure 22. In an example, the discharge opening 32 is provided as an upwardly oriented opening of the container structure 22. In another example, the discharge opening 32 is provided by side wall portions of the container structure 22.

The term "bottom wall" refers to a wall segment or wall area provided in the lower part, facing downwards in a normal operation state. The term "side walls" also refers to a side wall arrangement with a continuous side wall or a plurality of side wall segments.

In relation with the centrifugal fan, the term "axial air inlet" relates to an air inlet or suction opening of the air movement device, for example provided in the vicinity of the rotating axis of the centrifugal fan, or in the vicinity of the rotating axis of an axial fan. In case of a centrifugal fan, the air inlet may be provided between the rotating axis and the circumference described by rotating blades (or vanes) of the centrifugal fan.

In an example, the air movement device is provided downstream of the heating device. In another example, the heating device is provided downstream of the air movement device. In a further example, heating is provided upstream and downstream of the air movement device.

The air outlet may be provided as a radial air outlet, as already mentioned above. However, the air may be blown out also with a tangential movement component.

In an example, the receiving volume 24 is a sub-volume (i.e. a part of the volume) of the food preparation chamber 12.

The tilted arranged of the air movement device 14 provides the effect that a circulating part of the air flow is provided with a minimized degree of bents of the air duct or air path, and the sharpest bent is located at the air inlet of the fan. This means a minimized resistance for the air flow, and thus improves the air flow rate.

Figure 6:
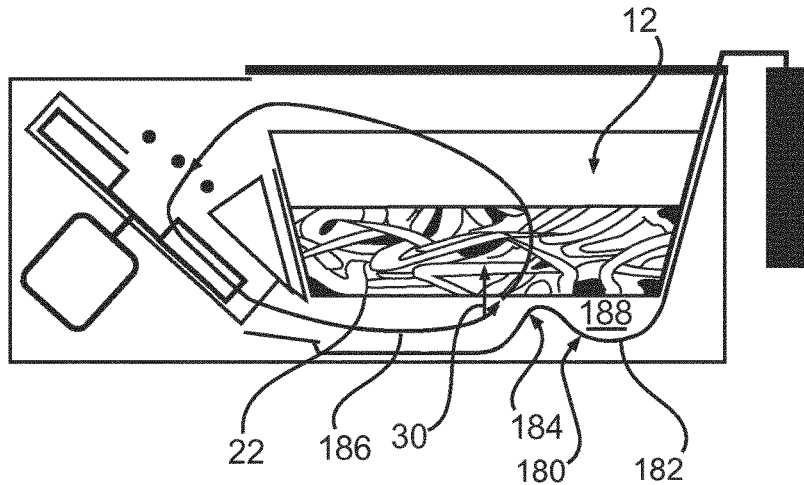
FIG. 6 shows a schematic cross-section of a further example of an apparatus for preparing food with a collecting device below a food preparation chamber.

FIG. 6 shows a further example, wherein a collecting device 180 with a collection volume 182 is provided below the food preparation chamber 12 for collecting residual material. The term "residual material" refers to, for example, oil, and particles.

In a further example, an air guiding element 184 is provided that directs a horizontal air flow 186 below the container structure 22 in an upwards direction towards the air entry opening 30. The collecting device 180 is arranged besides the air guiding element 184 on a side 188 facing away from the horizontal air flow 186.

The collecting device 180 is arranged on the leeside of the air guiding element, i.e. the air guiding element is providing shading of the heated air stream. In an example, the collecting device is provided by at least one recess in the removable or detachable pan. In an example, the recess in the removable pan is provided with a drainage opening, and a removable collecting receptacle is provided below the opening (not further shown).

In a further example, the collecting device is provided as a separate inlay placed into a recess of the removable pan (also not further shown).

Figure 7A:
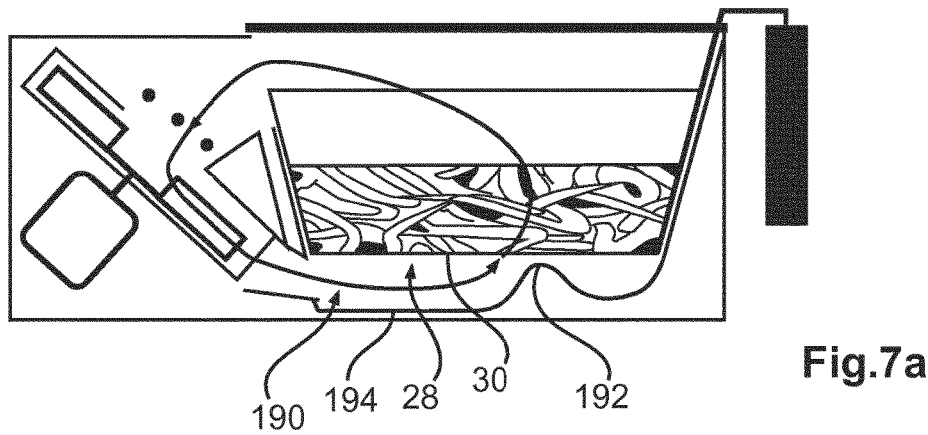
FIG. 7 shows a further example of an apparatus for preparing food with an air guide below an entry opening of a food preparation chamber in a schematic cross-section in FIG. 7A, and in a perspective view (not showing the food preparation chamber and the air movement device, among others) in FIG. 7B.
Figure 7B:
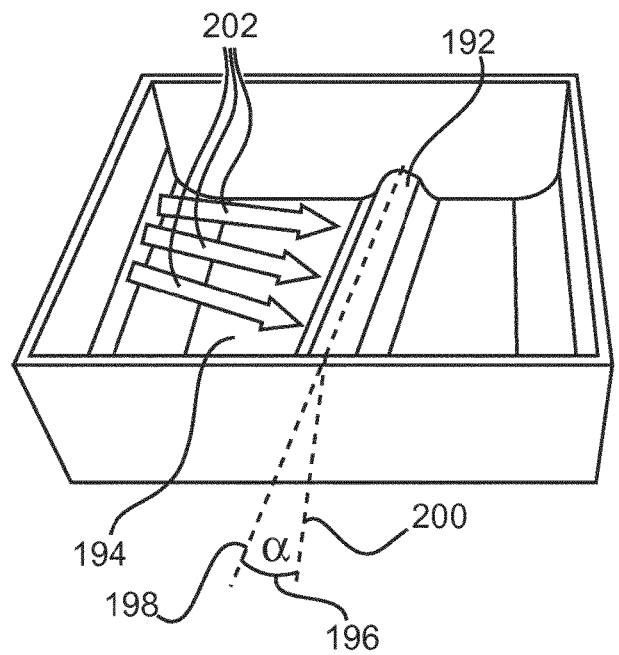

FIG. 7 shows a further example in a cross-section in FIG. 7A, and a perspective view in FIG. 7B. An air-distributing duct 190 is provided below the air entry opening 30 of the bottom wall 28. An air guide 192 is provided as an elevation arranged on a lower surface 194 of the air distributing duct 190 below the air entry opening 30. For example, the elevation is extending across the cross-section of the air distributing duct 190. In an example, the elevation is extending across at least a third of the cross-section, for example in one section or also in separated sections. In a further example, the elevation is extending across at least half of the cross-section. For example, as shown, the elevation is extending across the whole width of the cross-section, as shown in FIG. 7B. The air guide 192 is arranged in a skewed manner, indicated with an angle 196 between the linear extension indicated with a first dotted line 198, and a perpendicular (or rectangular angle of the general or mean direction of the air distributing duct, which perpendicular is indicated with a second dotted line 200. The air guide is arranged in the skewed manner 196 in relation to a perpendicular direction of an out-blowing direction of an air outlet such that below the air entry opening 30, an evenly distributed air flow is provided. This is indicated with three air stream indicating arrows 202 in FIG. 7B.

The "skewed manner" relates to an angle of at least 5° or 10° to the perpendicular direction of the out-blowing direction. The "out-blowing direction" relates to a central air flow direction of the blown out air stream.

The elevation may be extending over the complete cross-section of the width, as mentioned above, or also only over a part. Further, the air guide 192 can be provided as linear air guide, as shown. In another example (not shown), the air guide is provided in a curved manner.

Figure 8:
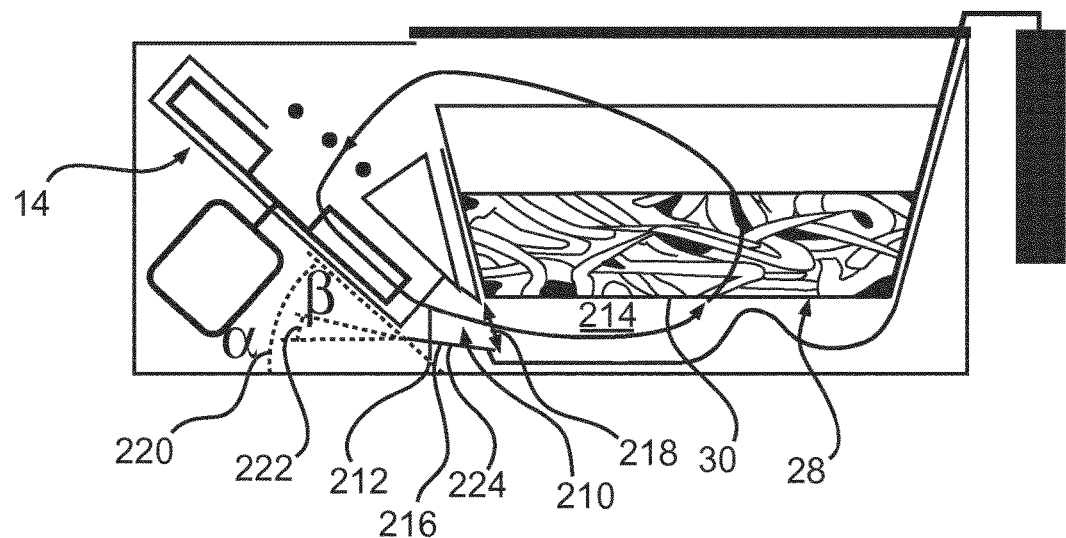
FIG. 8 shows a cross-section of a further example of an apparatus for preparing food with a flow spreader between an air movement device and an air distribution zone below the air entry opening of a food preparation chamber.

FIG. 8 shows a further example, wherein a flow spreader 210 is provided between the air outlet 212 of the air movement device 14 and an air distribution zone 214 provided below the air entry opening 30 of the bottom wall 28. The flow spreader is provided as a duct segment 216 with a decreasing cross-section, indicated with double arrow 218, across an air passage direction to compensate for an asymmetrical air output of the air outlet. The flow spreader is provided as an inclined wall of an air duct. For example, the bottom wall segment is inclined in relation to the horizontal. In an example, a rip structure is provided in the duct segment 216. For example, the inclined wall has a tilted angle in relation to the horizontal that is smaller than the tilted angle of the rotating plane in relation with the horizontal. For example, a first angle 220 indicates the angle of the rotating plane in relation with the horizontal, and a second angle 222 indicates an angle of the inclined wall, for example wall segment 224, with the horizontal. As can be seen, the second angle is smaller than the first angle.

Figure 9:
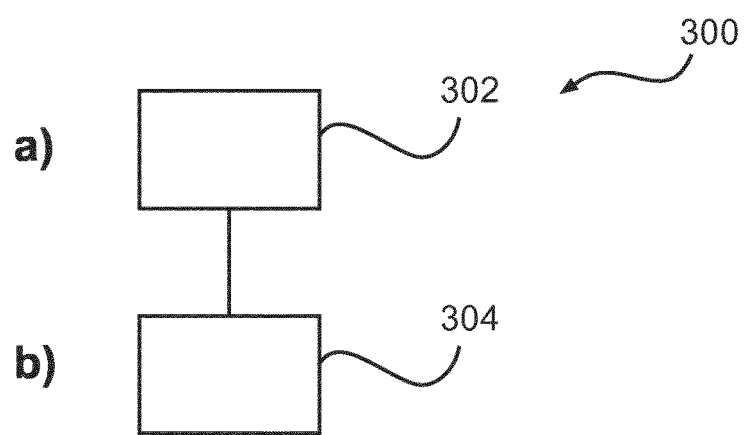
FIG. 9 shows basic steps of a method for preparing food.

FIG. 9 shows an example of a method 300 for preparing food in a desk-appliance apparatus, comprising the following steps: In a first step 302, food is provided in a food preparation chamber provided by a container structure at least partly enclosing a receiving volume for receiving the food to be prepared. In a second step 304, a through-streaming of hot air is provided in the food preparation chamber. The through-streaming of hot air is provided by an air movement device and a heating device. A circulating air flow is provided by air guiding means providing an air duct arrangement from the discharge opening of the container structure via the heating device and the air movement device to an air entry opening of the container structure. The air is heated by the heating device that is arranged out-of-sight of the receiving volume.

The first step 302 is also referred to as step a), and the second step 304 as step b).

For the air movement, a fan with an air inlet and an air outlet is provided, wherein the fan is provided sidewards of the food preparation chamber in a further example.

It must be noted that further examples of the method are provided in relation with the above-mentioned features of the different embodiments.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A desk-appliance apparatus for preparing food, comprising:
   a food preparation chamber;
   an air movement device;
   a heating device; and
   air guiding means,
   wherein the food preparation chamber includes a removable container structure that at least partly encloses a receiving volume for receiving food to be prepared by a through-streaming of hot air,
   wherein the removable container structure comprises sidewalls and a bottom wall,
   wherein at least the bottom wall of the removable container structure is air-permeable for providing an air entry opening for an entering of hot air into the receiving volume, wherein the entering of hot air into the receiving volume of the removable container structure facilitates the through-streaming of the hot air into the food received within the receiving volume, and
   wherein the removable container structure further comprises an air discharge opening in a top of the removable container structure,
   wherein the heating device is arranged out-of-sight of the receiving volume and configured to heat air of an air flow provided by the air movement device,
   wherein the air guiding means include an air duct arrangement configured to guide air (i) from the air discharge opening of the removable container structure via the heating device and the air movement device and (ii) to the air entry opening of the removable container structure,
   wherein the air duct arrangement further includes an air distributing duct below the air entry opening of the bottom wall of the removable container structure,
   wherein the air distributing duct includes an air guide that comprises an elevation arranged on a lower surface of the air distributing duct below the air entry opening of the bottom wall of the removable container structure, and
   wherein the air guide is arranged in a skewed manner in relation to a perpendicular direction of an out-blowing direction of an air outlet of the air movement device such that an evenly distributed air flow is provided below the air entry opening of the bottom wall of the removable container structure.

2. The apparatus according to claim 1, wherein the heating device is arranged sidewards of the food preparation chamber.

3. The apparatus according to claim 1,
   wherein the air movement device is a fan with an air inlet and an air outlet; and wherein the fan is provided sidewards of the food preparation chamber.

4. The apparatus according to claim 1, wherein the air movement device comprises a fan that includes an air suction side and an air blowout side,
   wherein, during operation of the fan, air is blown out at the air blowout side with a mean blowing direction, and
   wherein the mean blowing direction includes a tilted angle to both a horizontal and a vertical of the desk-appliance apparatus.

5. The apparatus according to claim 3, wherein the fan is a centrifugal fan with an axial air inlet and a radial air outlet,
   wherein the centrifugal fan comprises a fan blade configured to rotate in a plane of rotation, and
   wherein the plane of rotation includes a tilted angle to both a horizontal and a vertical of the desk-appliance apparatus.

6. The apparatus according to claim 4, wherein the tilted angle comprises an angle to the horizontal in a range of approximately 10° to 80°.

7. The apparatus according to claim 1, further comprising:
   a housing structure with a height, and wherein:
   a first line is defined by an axis of rotation of the air movement device,
   a second line is arranged perpendicular to the first line in a plane of rotation of the air movement device, and
   a third line is perpendicular to the bottom wall of the removable container structure and through a centre of the bottom wall,
   wherein the first line, the second line and the third line are arranged in one plane and form a triangle, and
   wherein an inner circle of the triangle is arranged inside the housing structure,
   wherein the axis of rotation and the plane of rotation of the air movement device are configured such that the first and the second line have an intersection point that is arranged in a middle region of the height of the housing structure; and wherein the inner circle has a maximum diameter within the housing structure.

8. The apparatus according to claim 1, wherein an air duct arrangement comprises a number of guiding portions, in which an air flow direction is changed;
   wherein a first guiding portion is provided downstream following the air movement device, and a second guiding portion is provided upstream in front of the air movement device; and
   wherein the first guiding portion provides a lower degree of change of direction of the airflow than the second guiding portion.

9. The apparatus according to claim 1, further comprising:
   sensor means, in relation with the air movement device, for detecting air temperature of an airstream supplied by the air movement device.

10. The apparatus according to claim 1, further comprising:
    a removable pan structure into which the food preparation chamber is at least partly inserted, wherein the removable pan structure is below the food preparation chamber, under the removable container structure, and
    wherein the removable pan structure forms an air-guiding duct between (i) the removable pan structure and (ii) the bottom wall of the removable container structure for guiding a heated air stream from an air outlet of the air movement device to the air entry opening of the removable container structure.

11. The apparatus according to claim 1, further comprising:
    a collecting device with a collection volume, wherein the collecting device is located below the food preparation chamber, under the removable container structure, for collecting residual material.

12. The apparatus according to claim 11, wherein the air duct arrangement further includes an air-guiding element that re-directs a horizontal air-flow below the removable container structure into an upwards direction towards the air entry opening of the removable container structure, and
    wherein the collecting device is arranged besides the air-guiding element on a side facing away from the horizontal air-flow.

13. The apparatus according to claim 1, further comprising:
    a flow spreader between (i) an air outlet of the air movement device and (ii) an air distribution zone below the air entry opening of the bottom wall of the removable container structure,
    wherein the flow spreader comprises a duct segment with a decreasing cross-section across an air passage direction to compensate for an asymmetrical air output of the air outlet of the air movement device.

14. A method for preparing food via a desk-appliance apparatus, the method comprising:
    a) providing a food preparation chamber that includes a removable container structure that at least partly encloses a receiving volume for receiving food to be prepared by a through-steaming of hot air; and
    b) providing the through-steaming of hot air in the food preparation chamber via an air movement device, a heating device, and an air guiding means,
    wherein the removable container structure comprises sidewalls and a bottom wall,
    wherein at least the bottom wall of the removable container structure is air-permeable for providing an air entry opening for an entering of hot air into the receiving volume, wherein the entering of hot air into the receiving volume of the removable container structure facilitates the through-streaming of the hot air into the food received within the receiving volume,
    wherein the removable container structure further comprises an air discharge opening in a top of the removable container structure,
    wherein the heating device is arranged out-of-sight of the receiving volume and configured to heat air of an air flow provided by the air movement device,
    wherein a circulating air flow is provided by the air guiding means that includes an air duct arrangement configured to guide air (i) from the discharge opening of the removable container structure via the heating device and the air movement device and (ii) to the air entry opening of the removable container structure
    wherein the air duct arrangement further includes an air distributing duct below the air entry opening of the bottom wall of the removable container structure,
    wherein the air distributing duct includes an air guide that comprises an elevation arranged on a lower surface of the air distributing duct below the air entry opening of the bottom wall of the removable container structure, and
    wherein the air guide is arranged in a skewed manner in relation to a perpendicular direction of an out-blowing direction of an air outlet of the air movement device such that an evenly distributed air flow is provided below the air entry opening of the bottom wall of the removable container structure.

* * * * *